(12) United States Patent  (10) Patent No.: US 8,578,187 B1
Wong  (45) Date of Patent: Nov. 5, 2013

(54) PORTABLE POWER BANK WITH CARD READING FUNCTION

(75) Inventor: John Wong, Taipei (TW)

(73) Assignee: Gigastone America Corp CA (US)

( * ) Notice: Subject to any disclaimer, the term of this patent is extended or adjusted under 35 U.S.C. 154(b) by 0 days.

(21) Appl. No.: 13/530,586

(22) Filed: Jun. 22, 2012

(30) Foreign Application Priority Data

Apr. 26, 2012 (TW) .............................. 101207836 A

(51) Int. Cl.
  *G06F 1/00* (2006.01)
(52) U.S. Cl.
  USPC .......................................................... 713/300
(58) Field of Classification Search
  USPC ................................. 713/300, 323
  See application file for complete search history.

(56) References Cited

U.S. PATENT DOCUMENTS

| | | | |
|---|---|---|---|
| 5,894,120 A * | 4/1999 | Arase et al. .................... | 235/432 |
| 6,402,039 B1 * | 6/2002 | Freeman et al. .............. | 235/492 |
| 6,848,615 B2 * | 2/2005 | Yamagami .................... | 235/383 |
| 7,401,127 B2 * | 7/2008 | Tsuda et al. .................. | 709/217 |
| 2008/0141180 A1 * | 6/2008 | Reed et al. ..................... | 715/854 |
| 2009/0179610 A1 * | 7/2009 | Lin ................ | 320/101 |
| 2010/0190046 A1 * | 7/2010 | Chen et al. ..................... | 429/156 |
| 2011/0178630 A1 * | 7/2011 | Green et al. .................. | 700/214 |

* cited by examiner

*Primary Examiner* — Mohammed Rehman

(57) ABSTRACT

A portable power bank with card reading function includes a battery unit, a charging unit, a control unit, a voltage converting unit, a first card reading unit, and a connection interface unit. The battery unit is coupled with the charging unit and the voltage converting unit. The control unit is coupled with the charging unit, the voltage converting unit and the first card reading unit. The connection interface unit is coupled with the voltage converting unit and the control unit. The first card reading unit is configured for a first removable electronic card to insert thereinto. An electronic device is removably connected to the connection interface unit.

24 Claims, 21 Drawing Sheets

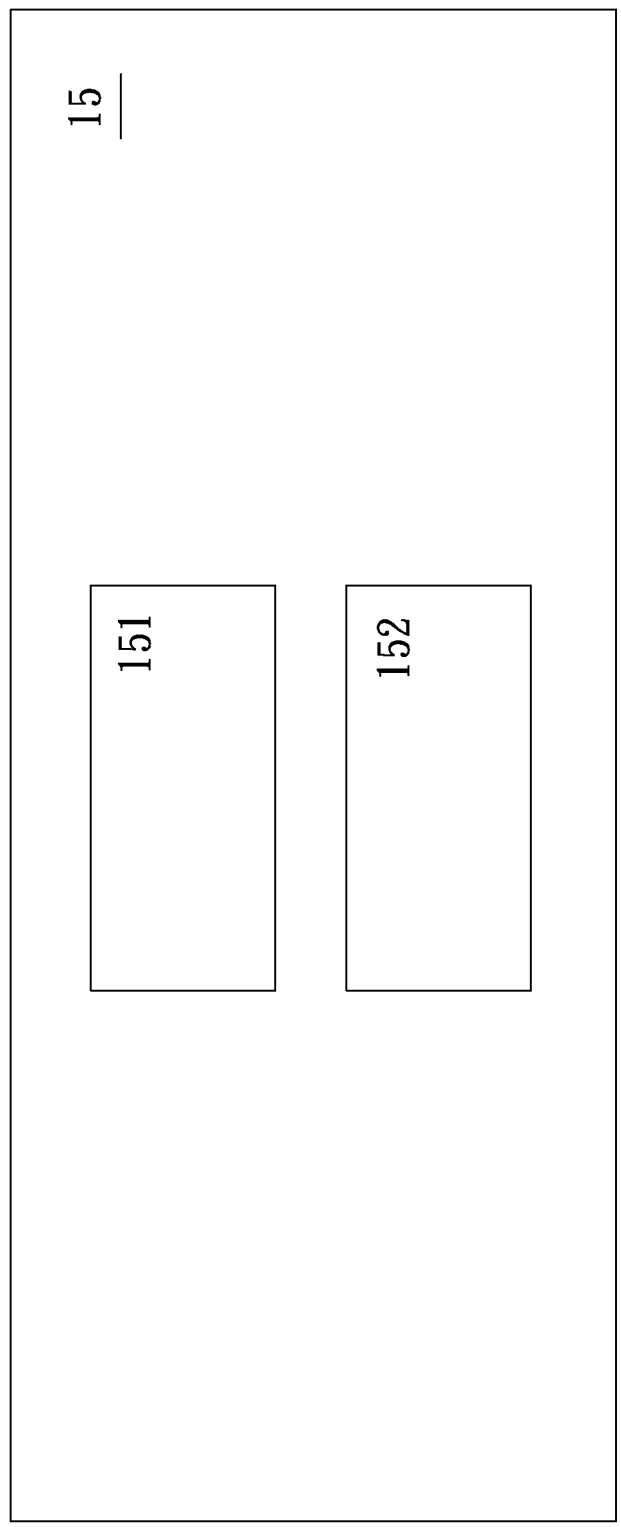

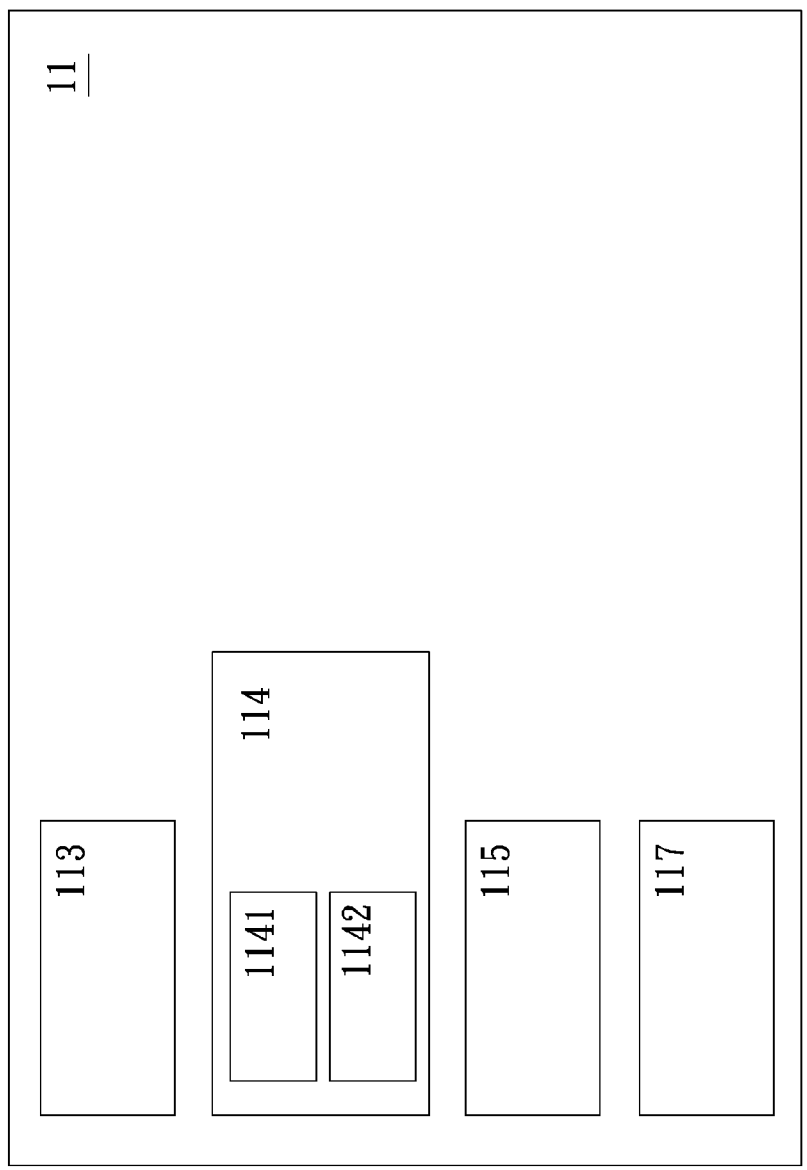

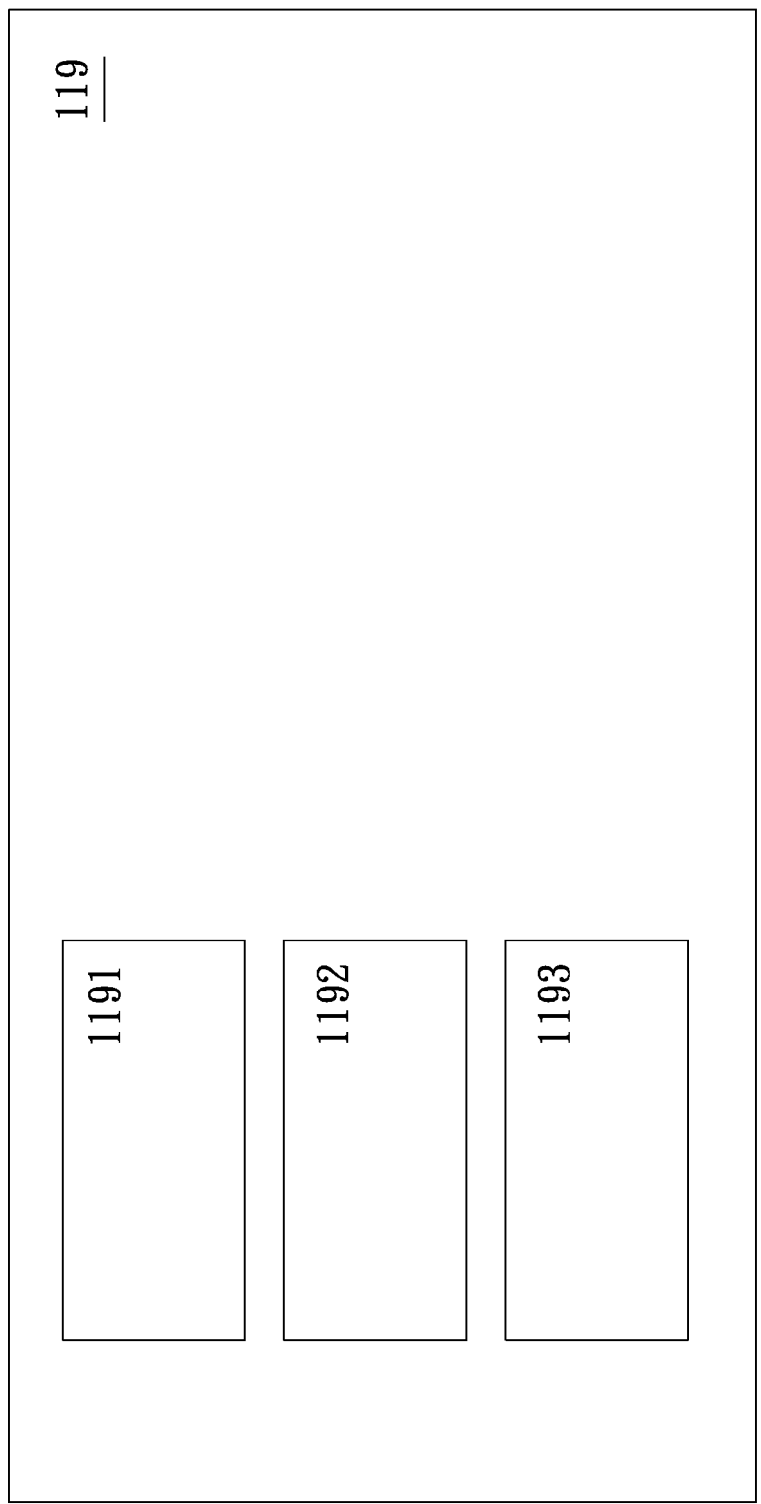

US 8,578,187 B1

PORTABLE POWER BANK WITH CARD READING FUNCTION

FIELD OF THE INVENTION

The present invention relates to a portable power bank with card reading function, and more particularly to a portable power bank that can be conveniently carried about for expanding the memory capacity of and supplying power to other electronic devices.

BACKGROUND OF THE INVENTION

A wide range of portable electronic devices currently available in the market, such as smartphones, tablet computers and the like, has been configured to support fast-response and human-centered applications. For this purpose, advanced processors and many sensing elements are employed in designing the portable electronic devices. However, since the advanced processors and sensing elements consume a high amount of power during the operation thereof, the portable electronic devices using them must be supplied with supplementary power from time to time.

Currently, there are two ways for charging a portable electronic device. In the first way, a battery inside the electronic device is charged by directly connecting the electronic device to an external power source via a transmission cable. In the second way, the battery in the electronic device is taken out and charged via a battery charger. In either way, a charger is needed. The charger is connected to a wall socket providing AC grid power, which is then converted by a transformer into a charging power source having a specific voltage level for charging the battery. However, for a user who works outdoors or is in an environment in which no power supply is available, it is impossible to immediately charge an electronic device that runs out of power. Moreover, for a completely sealed electronic device, such as an iPhone and an iPad, the battery is sealed in the device and can not be taken out, and the device must always be charged via a transmission cable. It is of course very inconvenient to do so.

The sealed electronic device is particularly inconvenient for use when it does not provide any connector or card reader slot with a USB interface. Under this circumstance, once the built-in memory in the electronic device is full, a user can not backup the data in the memory or expand the memory capacity but to delete some of the stored files.

To solve the power supply and memory expansion problems encountered by most portable electronic devices, various types of portable power banks and externally connected card readers have been developed. A portable power bank is a compact device for storing backup power supply and can be conveniently carried about for connecting to an electronic device to charge the same. With the portable power bank, an electronic device can be used at any place without the problem of running out of power. On the other hand, an external card reader is configured for a memory card to insert thereinto. When the external card reader is connected to an electronic device, the memory card inserted in the card reader can serve as an expanded memory of the electronic device or be used to backup the data of the electronic device.

Since the existing portable electronic devices all are designed to have small volume and low weight, they are usually provided with only one connection port for connecting to a portable power bank or an external card reader. That is, when the electronic device is connected to one of the portable power bank and the external card reader, the other one of them would not be able to connect to the electronic device at the same time.

SUMMARY OF THE INVENTION

The present invention is directed to a portable power bank with card reading function, which enables an electronic device connected thereto to have expanded memory capacity or to backup data and to obtain supplementary power supply at the same time.

The present invention is also directed to a portable power bank with card reading function, with which an electronic device connected to it can not only access data in a wired or a wireless manner, but also be charged.

The present invention is also directed to a portable power bank with card reading function, which not only provides card reading and charging functions, but also enables linking with a receiving end via wireless transmission.

The present invention is also directed to a portable power bank with card reading function, which also includes at least one APP program.

The present invention is also directed to a portable power bank with card reading function, which also includes an amplifier and a loudspeaker for outputting a sound signal from an electronic device connected thereto.

The present invention is also directed to a portable power bank with card reading function, which includes a NAND flash memory unit and a NAND flash memory module to serve as a storage interface.

One embodiment of the present invention provides a portable power bank with card reading function that is configured for at least one electronic device to connect thereto. The portable power bank includes a battery unit, a control unit, a first card reading unit and a connection interface unit. The battery unit is coupled with a charging unit and a voltage converting unit, and the battery unit stores an external power supply via the charging unit and outputs a battery power supply via the voltage converting unit. The control unit is coupled with the charging unit and the voltage converting unit, and includes a charging module, a card-reading-unit module, and a data transmission module. The first card reading unit is configured for a first removable electronic card to insert thereinto and is coupled with the control unit, so as to access the first removable electronic card under control of the control unit. The connection interface unit is coupled with the voltage converting unit and the control unit, and the electronic device is connected to the connection interface unit.

According to an embodiment of the present invention, the connection interface unit is a USB (universal serial bus) connection interface; and the first removable electronic card can be a Secure Digital (SD) card, a Near Field Communication (NFC) card, a Compact Flash (CF) card, a Smart Media card (SMC), a Multi Media card (MMC), or a Memory Stick (MS) card. And, the first removable electronic card has at least one APP program stored therein.

According to an embodiment of the present invention, the portable power bank further includes a light-emitting unit electrically coupled with the voltage converting unit, and the light-emitting unit can be a light-emitting diode (LED). Moreover, the control unit further includes a wireless communication module, which includes an access point (AP) sub-module and a client sub-module.

According to an embodiment of the present invention, the portable power bank further includes a wireless communication unit that is electrically coupled with the control unit and includes an antenna for receiving a Bluetooth signal, a HiperLAN signal, a Triple Play signal, a GSM/GPRS signal, a 3G signal, a 3.5G signal, a 4G signal, an IEEE802.11 signal, an IEEE802.3 signal, an 802.15 signal, an 802.11 signal, or a WiFi Direct signal.

According to an embodiment of the present invention, the portable power bank further includes a second card reading unit for a second removable electronic card to insert thereinto and being coupled with the control unit, so as to access the second removable electronic card under control of the control unit. Wherein, the second removable electronic card can be a smart card, a magnetic card, a barcode card, or a proximity card. Moreover, the control unit further includes a security module, which can be a digital rights management (DRM) processor and includes an encryption sub-module and a decryption sub-module. Moreover, the voltage converting unit is used to convert the voltage of the external power supply, and further includes an overload protection module for preventing excessive output current and a detection module for detecting voltage and current of the electronic device connected to the connection interface unit. Moreover, the card-reading-unit module in the control unit further includes a host sub-module and a client sub-module.

According to an embodiment of the present invention, the portable power bank further includes an amplifier unit coupled with the control unit, the battery unit and a loudspeaker unit; and the control unit further includes a sound interface module connected to the amplifier unit.

According to an embodiment of the present invention, the portable power bank further includes a NAND flash memory unit, and the control unit further includes a NAND flash memory module. The NAND flash memory module includes a NAND flash memory interface sub-module, an error correction code (ECC) sub-module, and an error detection code (EDC) sub-module; and the NAND flash memory interface sub-module is connected to the NAND flash memory unit.

With the above arrangements, the portable power bank with card reading function according to the present invention can not only charge an electronic device connected thereto, but also enable expansion of memory capacity and data backup for the electronic device. Furthermore, the present invention also allow other electronic devices to access data on removable electronic cards inserted in the portable power bank via a wireless network and enable wireless transmission of data of transaction paid by card.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 1B is a block diagram of a voltage converting unit for the portable power bank with card reading function according to the first preferred embodiment of the present invention;

FIG. 3B is a block diagram of a control unit for the portable power bank with card reading function according to the second preferred embodiment of the present invention;

FIG. 5C is a block diagram of a NAND flash memory module included in the control unit for the fourth preferred embodiment of the present invention;

DETAILED DESCRIPTION OF THE PREFERRED EMBODIMENTS

Figure 1A:
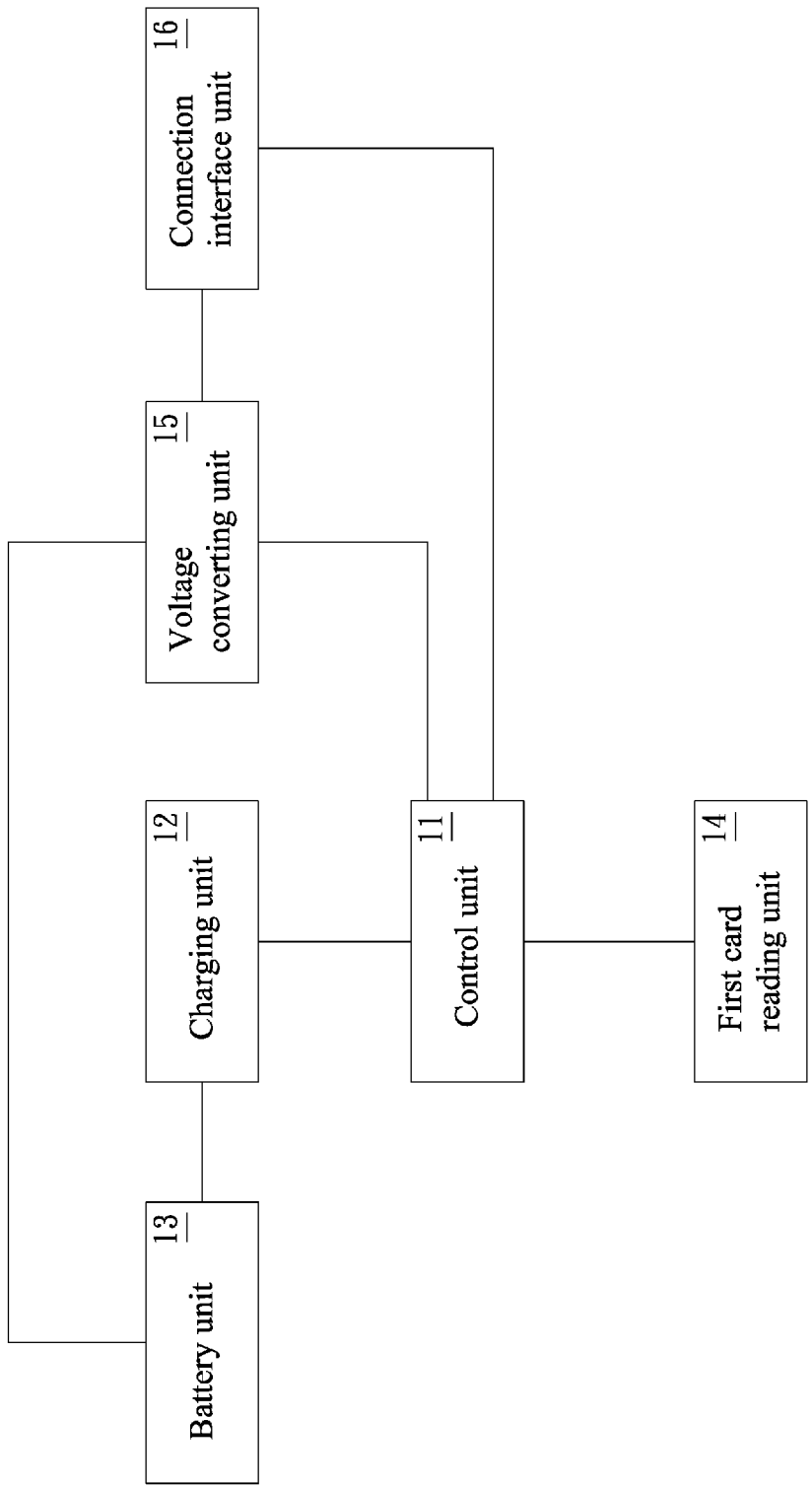
FIG. 1A is a block diagram of a portable power bank with card reading function according to a first preferred embodiment of the present invention.

The present invention will now be described with some preferred embodiments thereof and with reference to the accompanying drawings. For the purpose of easy to understand, elements that are the same in the preferred embodiments are denoted by the same reference numerals.

First Preferred Embodiment

Please refer to FIG. 1A that is a block diagram of a portable power bank with card reading function according to a first preferred embodiment of the present invention. As shown, the portable power bank in the first preferred embodiment includes a battery unit 13 coupled with a charging unit 12 and a voltage converting unit 15, and a control unit 11 coupled with the charging unit 12, the voltage converting unit 15, a first card reading unit 14, and a connection interface unit 16. The voltage converting unit 15 is also coupled with the connection interface unit 16.

The connection interface unit 16 is connectable to an external power supply (Vout) or a computer or a portable electronic device, such as an iPhone or an iPad. And, the connection interface unit 16 can be, but not limited to, a USB interface unit supporting USB1.0, USB2.0 and USB3.0 protocols.

The battery unit 13 receives the external power supply (Vout) and stores the same, and is able to output the stored power supply as a battery power supply (Vbat). The output battery power supply can be, but not limited to, a direct current of 3.6V~4V, which can be supplied to the portable electronic device connected to the connection interface unit 16. The battery unit 13 can be, but not limited to, a lithium-ion battery, a lithium-iron battery, a lead-acid battery, or a lithium-manganese battery.

Please also refer to FIG. 1B that is a block diagram of the voltage converting unit 15. The voltage converting unit 15 is used to convert the voltage of the external power supply input via the connection interface unit 16 and the voltage of the battery power supply output from the battery unit 13. The voltage converting unit 15 includes an overload protection module 151 for preventing excessive output current, and a detection module 152 for detecting the voltage and current of the electronic device connected to the connection interface unit 16. In the event the electronic device is detected as low in potential, the electronic device is charged. The voltage converting unit 15 can be, but not limited to, a voltage conversion circuit.

The charging unit 12 is adapted to receive the external power supply and output the same to the battery unit 13 for charging the battery unit 13. When the battery unit 13 is fully charged, the charging unit 12 will generate a signal to the control unit 11. Further, the control unit 11, the first card reading unit 14 and the voltage converting unit 15 obtain the battery power supply (Vbat) from the battery unit 13 via the charging unit 12. The charging unit 12 can be, but not limited to, a charging circuit.

The first card reading unit 14 is configured for a first removable electronic card to removably insert thereinto, and is coupled with the control unit 11. The first card reading unit 14 can be, but not limited to, a memory card reader. The first removable electronic card has at least one APP program stored therein and can be, but not limited to, a Secure Digital (SD) card, a Near Field Communication (NFC) card, a Compact Flash (CF) card, a Smart Media card (SMC), a Multi Media card (MMC), or a Memory Stick (MS) card. The first removable electronic card inserted in the first card reading unit 14 can be accessed by a portable electronic device connected to the connection interface unit 16, and can therefore be used as an expanded memory capacity for the portable electronic device.

Figure 1C:
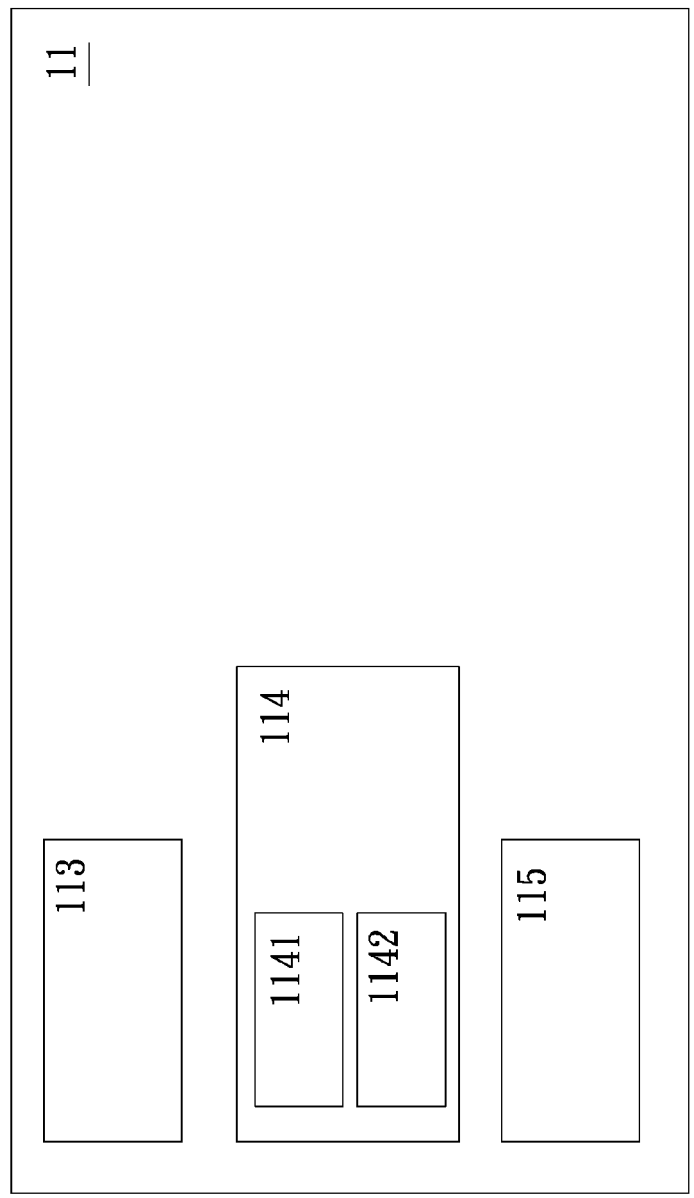
FIG. 1C is a block diagram of a control unit for the portable power bank with card reading function according to the first preferred embodiment of the present invention.

Please also refer to FIG. 1C. The control unit 11 includes a charging module 113, a card-reading-unit module 114, and a data transmission module 115. The battery unit 13 is charged under control of the charging module 113 to prevent overcharging the battery unit 13. When the portable power bank of the present invention inputs an external power supply, the control unit 11 controls the charging unit 12 to start charging the battery unit 13. When the battery unit 13 is fully charged, the control unit 11 stops the battery unit 13 from being further charged with the external power supply.

The card-reading-unit module 114 includes a host sub-module 1141 and a client sub-module 1142. The first card reading unit 14 accesses the data of the first removable electronic card under control of the card-reading-unit module 114. The host sub-module 1141 is actuated when the portable power bank of the present invention is connected to a portable electronic device, such as a smartphone or an iPad. On the other hand, the client sub-module 1142 is actuated when the portable power bank of the present invention is connected to a computer, for example. The control unit 11 can be, but not limited to, a central processing unit (CPU) or a microcontroller unit (MCU).

The data transmission module 115 controls the data transmission of the first removable electronic card inserted in the first card reading unit 14. Particularly, when the portable power bank of the present invention is connected to a portable electronic device, such as a smartphone or an iPad, the data transmission module 115 would first inform the portable electronic device of the position of the card-reading-unit module 114, so that the portable electronic device can be linked with the card-reading-unit module 114 to access the first removable electronic card inserted in the first card reading unit 14.

Figure 2A:
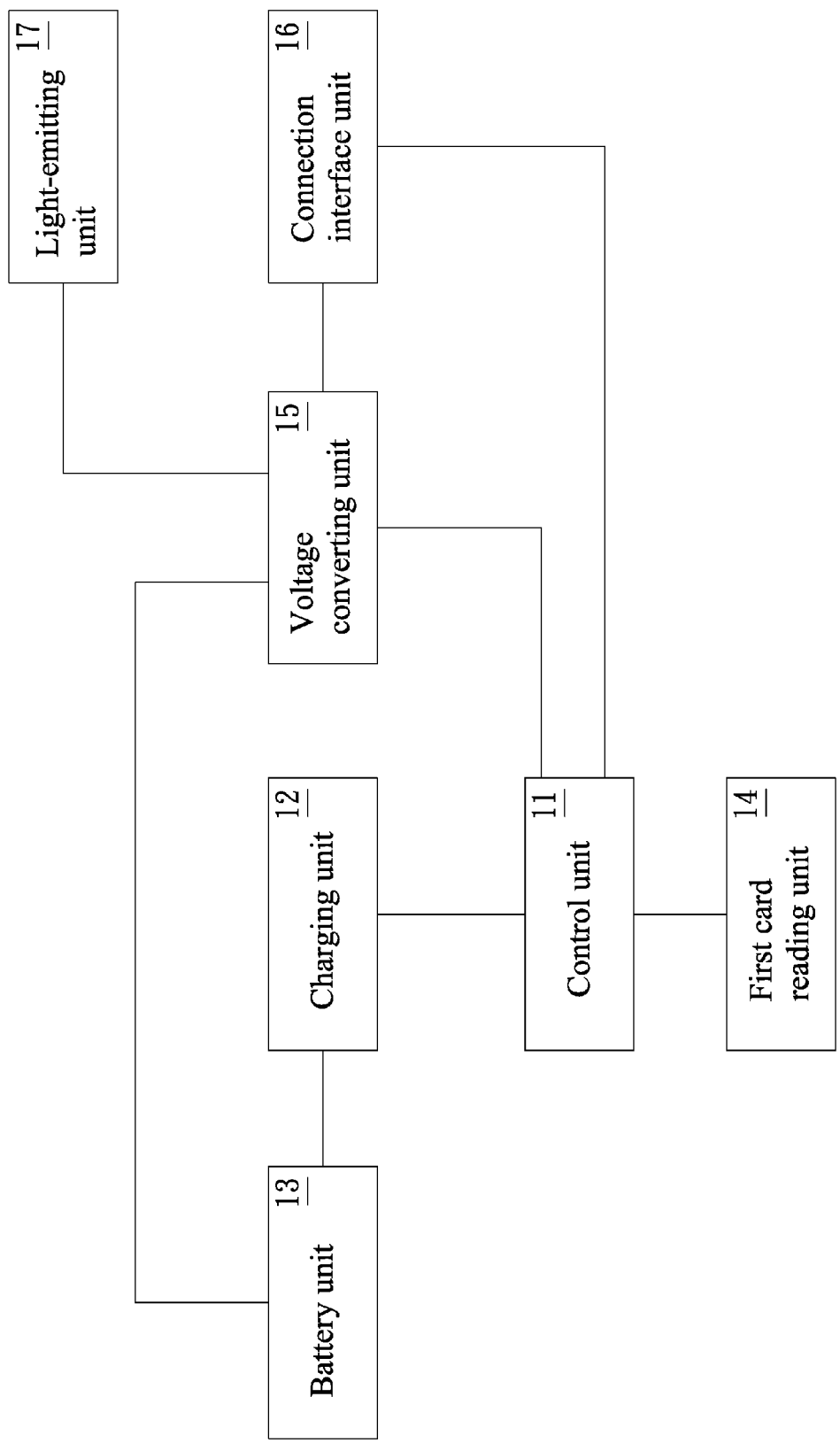
FIG. 2A is a block diagram showing a first variant of the first preferred embodiment of the present invention that further includes a light-emitting unit.

Please refer to FIG. 2A that is a block diagram showing a first variant of the first preferred embodiment of the present invention that further includes a light-emitting unit 17. The light-emitting unit 17 is electrically coupled with the voltage converting unit 15, and the battery power supply from the battery unit 13 is supplied via the voltage converting unit 15 to the light-emitting unit 17 for the same to emit light. The light-emitting unit 17 can be, but not limited to, a light-emitting diode (LED).

Figure 2B:
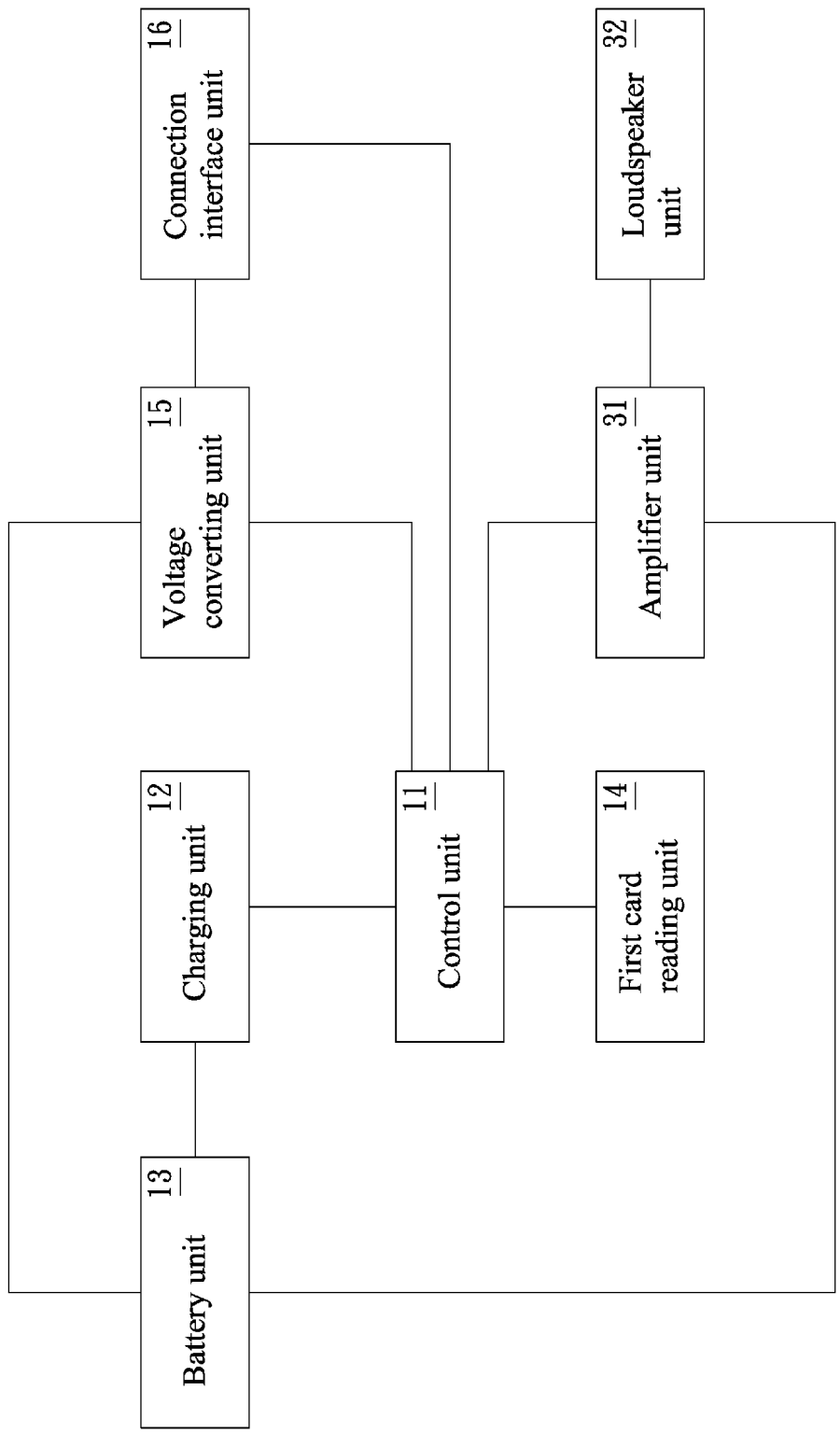
FIG. 2B is a block diagram showing a second variant of the first preferred embodiment of the present invention that further includes an amplifier unit and a loudspeaker unit.
Figure 2C:
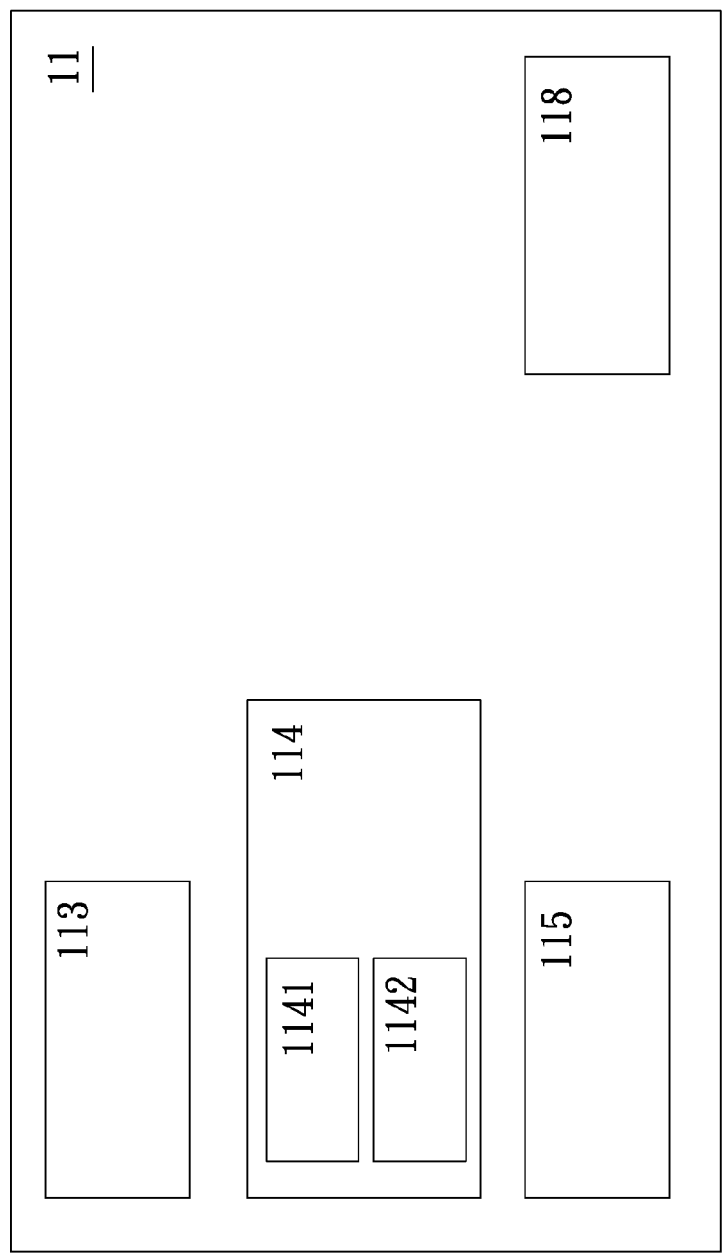
FIG. 2C is a block diagram of a control unit for the second variant of the first preferred embodiment of the present invention shown in FIG. 2B.

FIG. 2B is a block diagram showing a second variant of the first preferred embodiment of the present invention that further includes an amplifier unit 31 coupled with the control unit 11, the battery unit 13 and a loudspeaker unit 32. FIG. 2C is a block diagram of the control unit 11 for the second variant of the first preferred embodiment of the present invention shown in FIG. 2B. As shown, compared to the control unit 11 in FIG. 1C, the control unit 11 in FIG. 2C further includes a sound interface module 118 for connecting to the amplifier unit 31. A sound signal from the portable electronic device connected to the connection interface unit 16 can be output from the loudspeaker unit 32 via the sound interface module 118 and the amplifier unit 31.

Second Preferred Embodiment

Figure 3A:
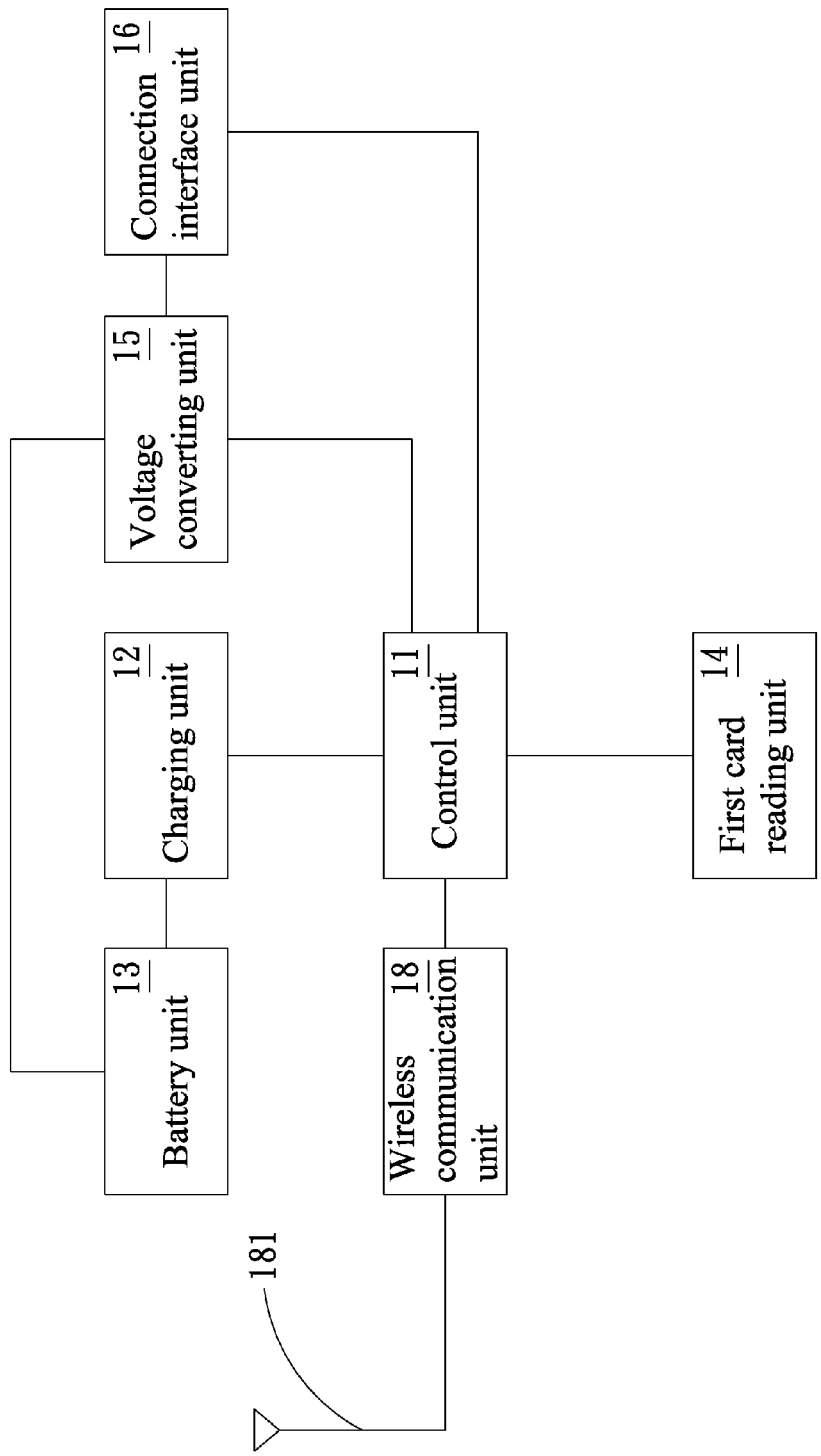
FIG. 3A is a block diagram of a portable power bank with card reading function according to a second preferred embodiment of the present invention.

Please refer to FIG. 3A that is a block diagram of a portable power bank with card reading function according to a second preferred embodiment of the present invention. The second preferred embodiment is generally structurally similar to the first preferred embodiment, except for a wireless communication unit 18 that is electrically coupled with the control unit 11. The wireless communication unit 18 includes an antenna 181 for receiving a wireless network signal. The wireless communication unit 18 can be, but not limited to, a WiFi, a 3G or 4G, or a Bluetooth communication unit, or a WiFi router or any other wireless router, such as a 3G or a 4G router.

The wireless network signal can be, but not limited to, a Bluetooth signal, a HiperLAN signal, a Triple Play signal, a GSM/GPRS signal, a 3G signal, a 3.5G signal, a 4G signal, an IEEE802.11 signal, an IEEE802.3 signal, an 802.15 signal, an 802.11 signal, or a WiFi Direct signal.

Figure 3C:
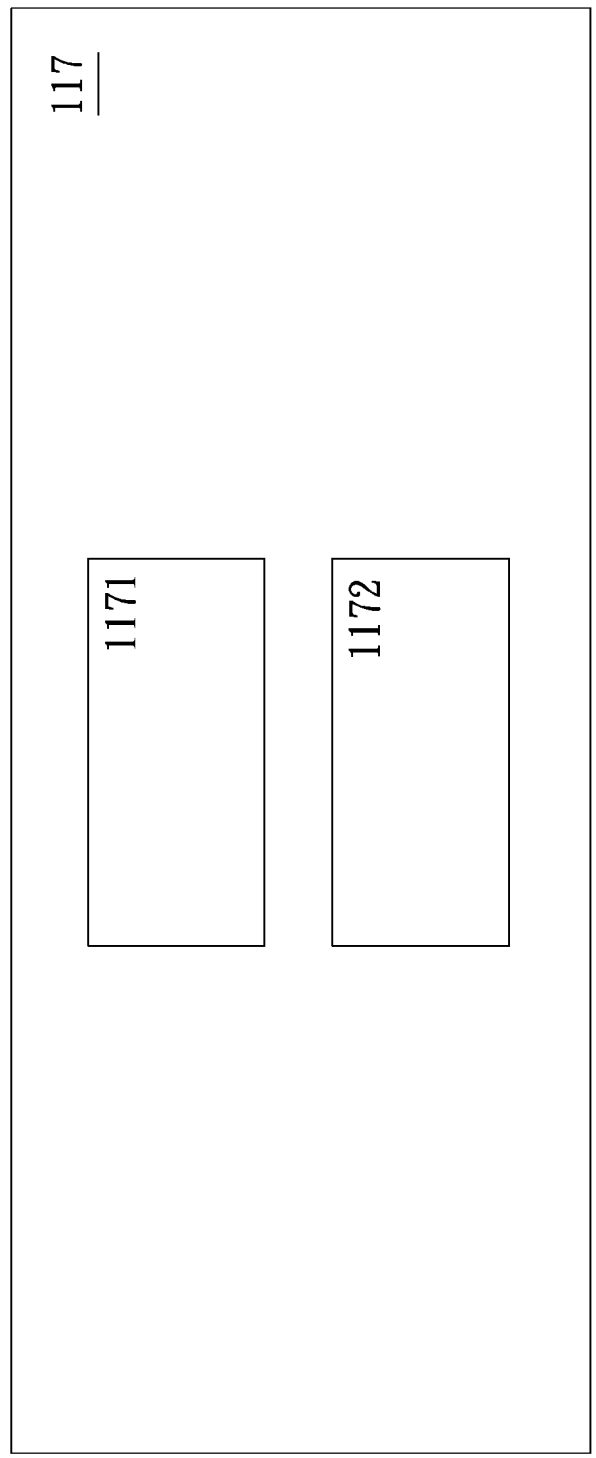
FIG. 3C is a block diagram of a wireless communication module included in the control unit for the second preferred embodiment of the present invention.

FIG. 3B is a block diagram showing the control unit 11 for the second preferred embodiment of the present invention further includes a wireless communication module 117 for connecting to the wireless communication unit 18. As shown in FIG. 3C, the wireless communication module 117 has an access point (AP) sub-module 1171 and a client sub-module 1172. When the wireless communication module 117 operates in a mode with the AP sub-module 1171 being actuated, the portable power bank according to the second preferred embodiment of the present invention serves as a wireless AP. On the other hand, when the wireless communication module 117 operates in a mode with the client sub-module 1172 being actuated, the portable power bank according to the second preferred embodiment of the present invention serves as a client to access other wireless access points.

Figure 3D:
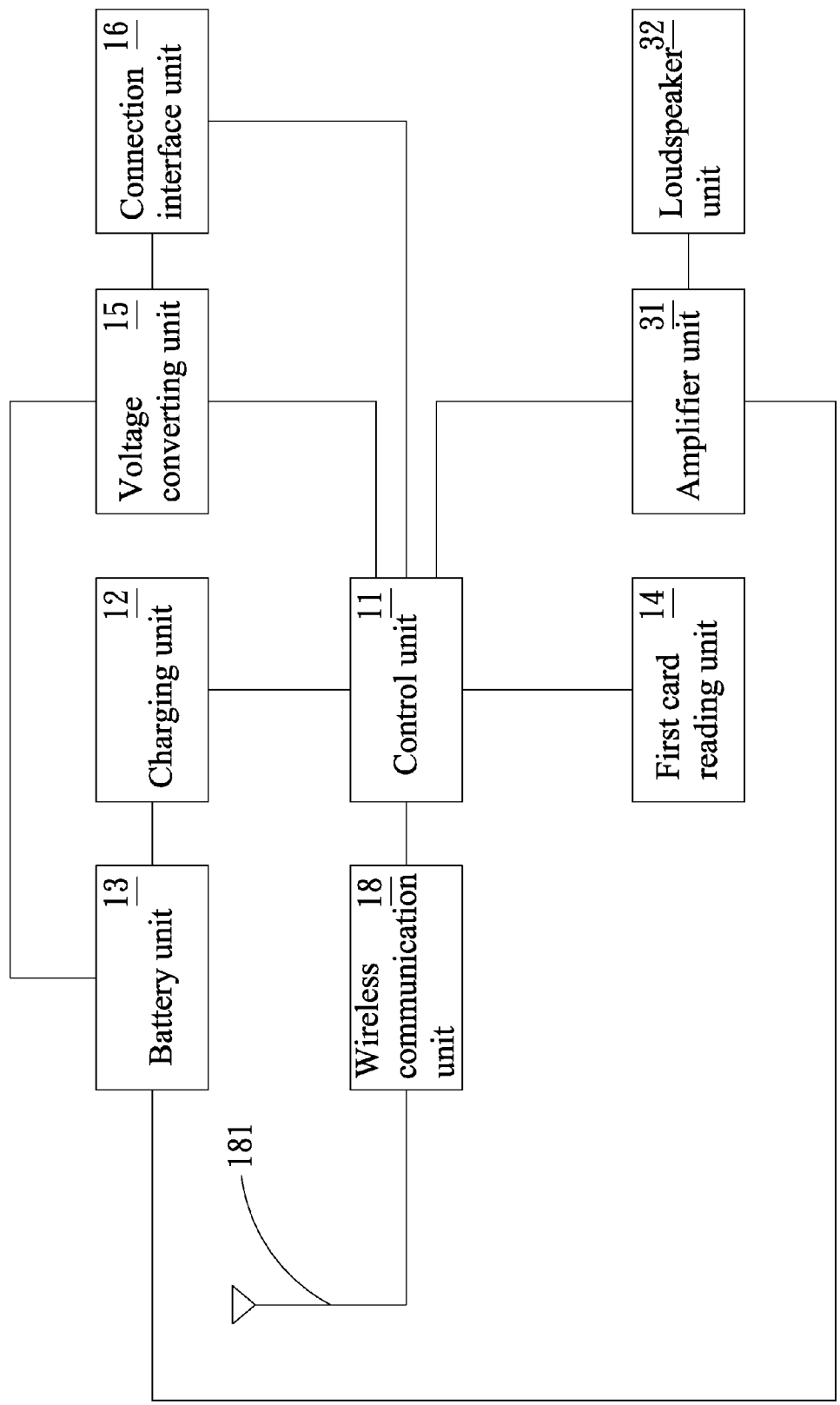
FIG. 3D is a block diagram showing a variant of the second preferred embodiment of the present invention that further includes an amplifier unit and a loudspeaker unit.
Figure 3E:
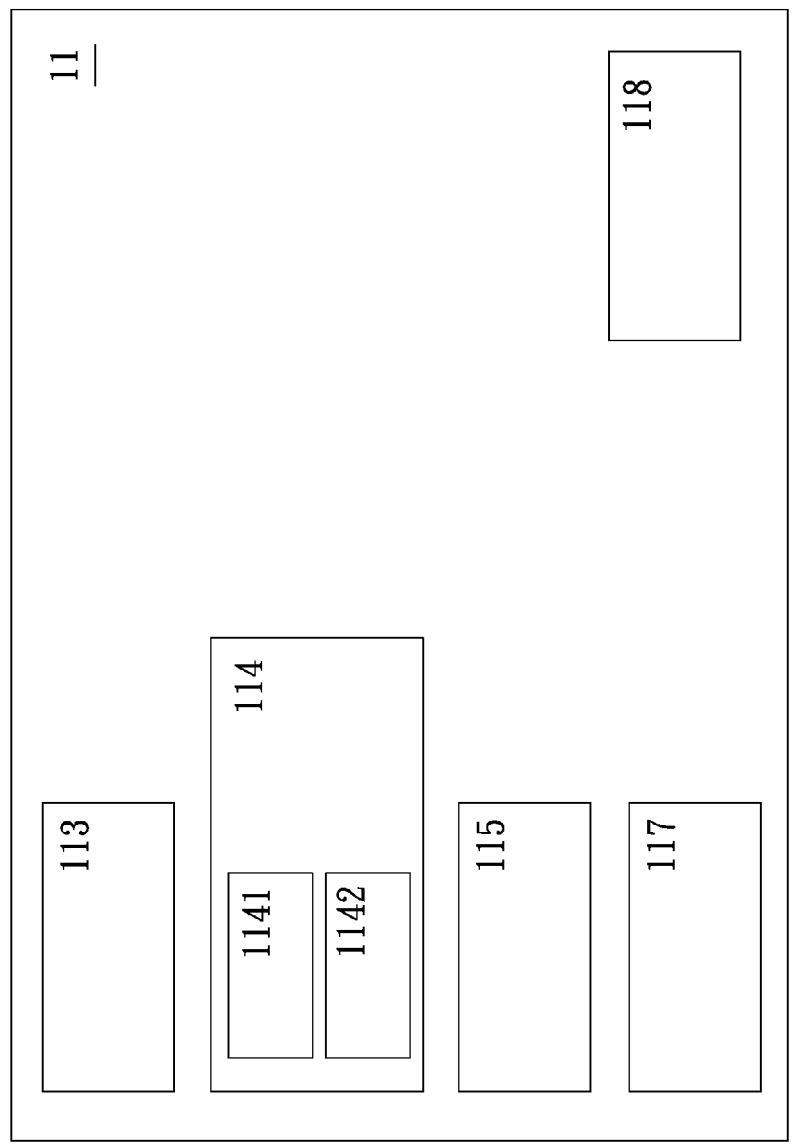
FIG. 3E is a block diagram of a control unit for the variant of the second preferred embodiment of the present invention shown in FIG. 3D.

FIG. 3D is a block diagram showing a variant of the second preferred embodiment of the present invention that further includes an amplifier unit 31 coupled with the control unit 11, the battery unit 13 and a loudspeaker unit 32. As shown in FIG. 3E, the control unit 11 for the variant of the second preferred embodiment further includes a sound interface module 118 for connecting to the amplifier unit 31. The portable power bank according to the variant of the second preferred embodiment of the present invention can receive a sound signal from the portable electronic device via the connection interface unit 16 or the wireless communication unit 18, and the received sound signal can be output from the loudspeaker unit 32 via the sound interface module 118 and the amplifier unit 31.

Third Preferred Embodiment

Figure 4A:
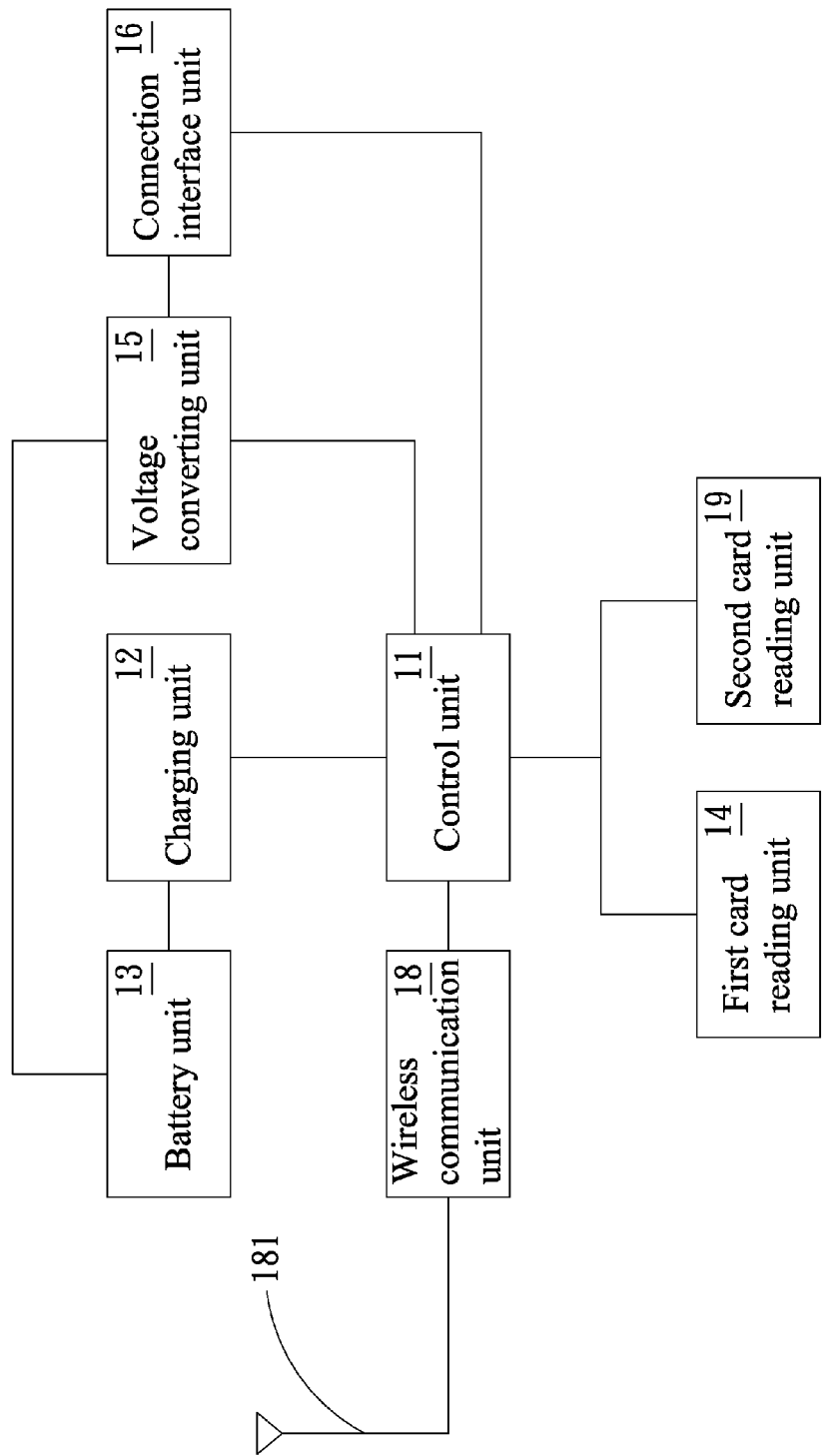
FIG. 4A is a block diagram of a portable power bank with card reading function according to a third preferred embodiment of the present invention.

Please refer to FIG. 4A that is a block diagram of a portable power bank with card reading function according to a third preferred embodiment of the present invention. The third preferred embodiment is generally structurally similar to the second preferred embodiment, except for a second card reading unit 19. The second card reading unit 19 is configured for a second removable electronic card to removably insert thereinto, and is coupled with the control unit 11 to access the second removable electronic card under control of the control unit 11. The second card reading unit 19 can be, but not limited to, an IC card reader, a barcode card reader, or a proximity card reader; and the second removable electronic card can be a smart card, a magnetic card, a barcode card, or a proximity card.

Figure 4B:
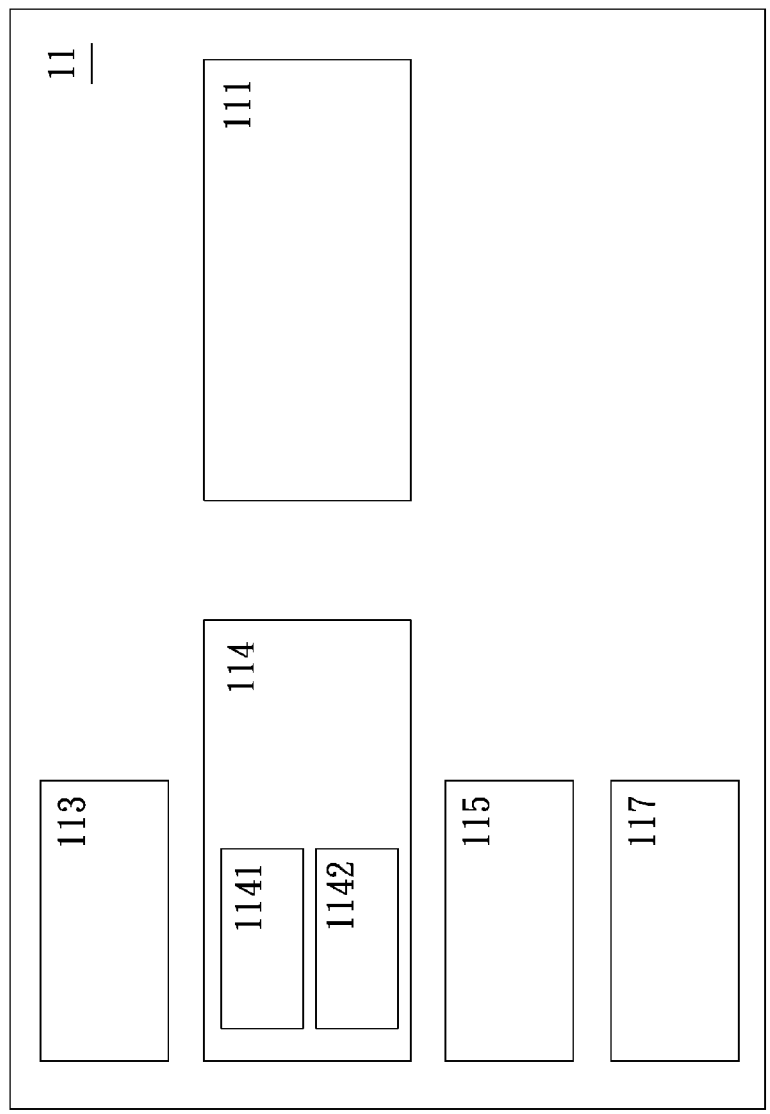
FIG. 4B is a block diagram of a control unit for the portable power bank with card reading function according to the third preferred embodiment of the present invention.
Figure 4C:
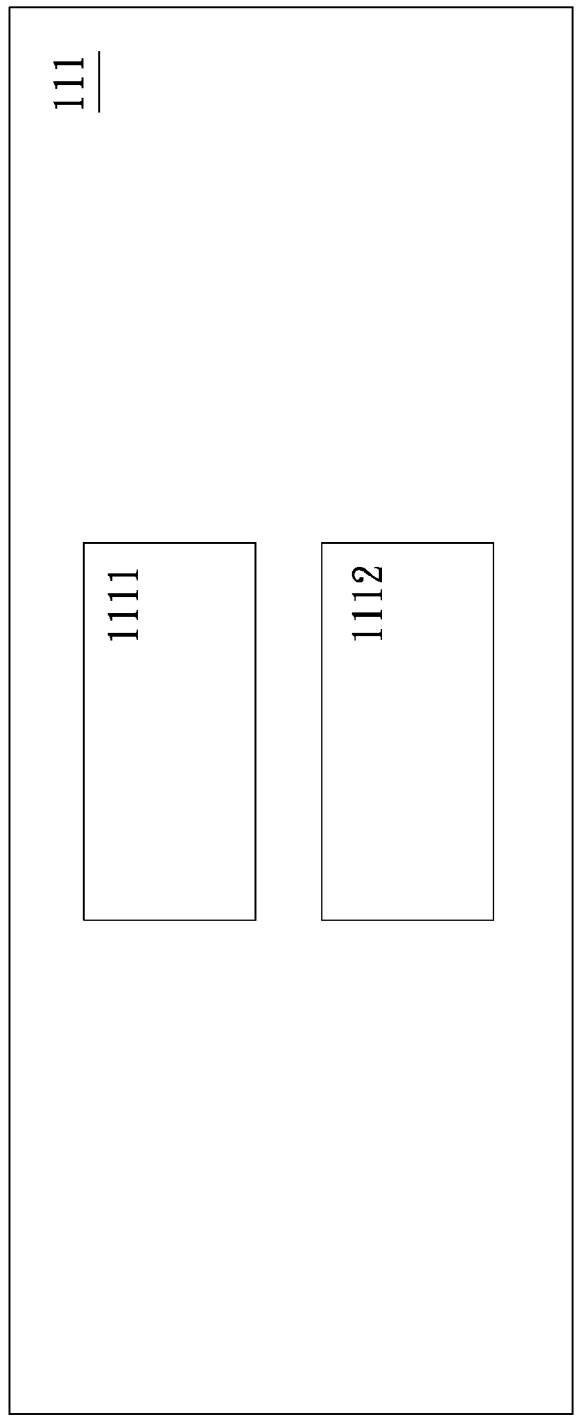
FIG. 4C is a block diagram of a security module included in the control unit for the third preferred embodiment of the present invention.

Please refer to FIG. 4B. The control unit 11 for the third preferred embodiment is different from the second preferred embodiment in further including a security module 111 for electrically connecting to the second card reading unit 19. As can be seen from FIG. 4C, the security module 111 includes an encryption sub-module 1111 and a decryption sub-module 1112, so as to encrypt the data of the second removable electronic card read by the second card reading unit 19 under control of the control unit 11. Meanwhile, the encrypted data can only be decrypted by a management system at a receiving end. Thus, leak of data of the second removable electronic card is prevented. The security module 111 can be, but not limited to, a digital rights management (DRM) processor.

Fourth Preferred Embodiment

Figure 5A:
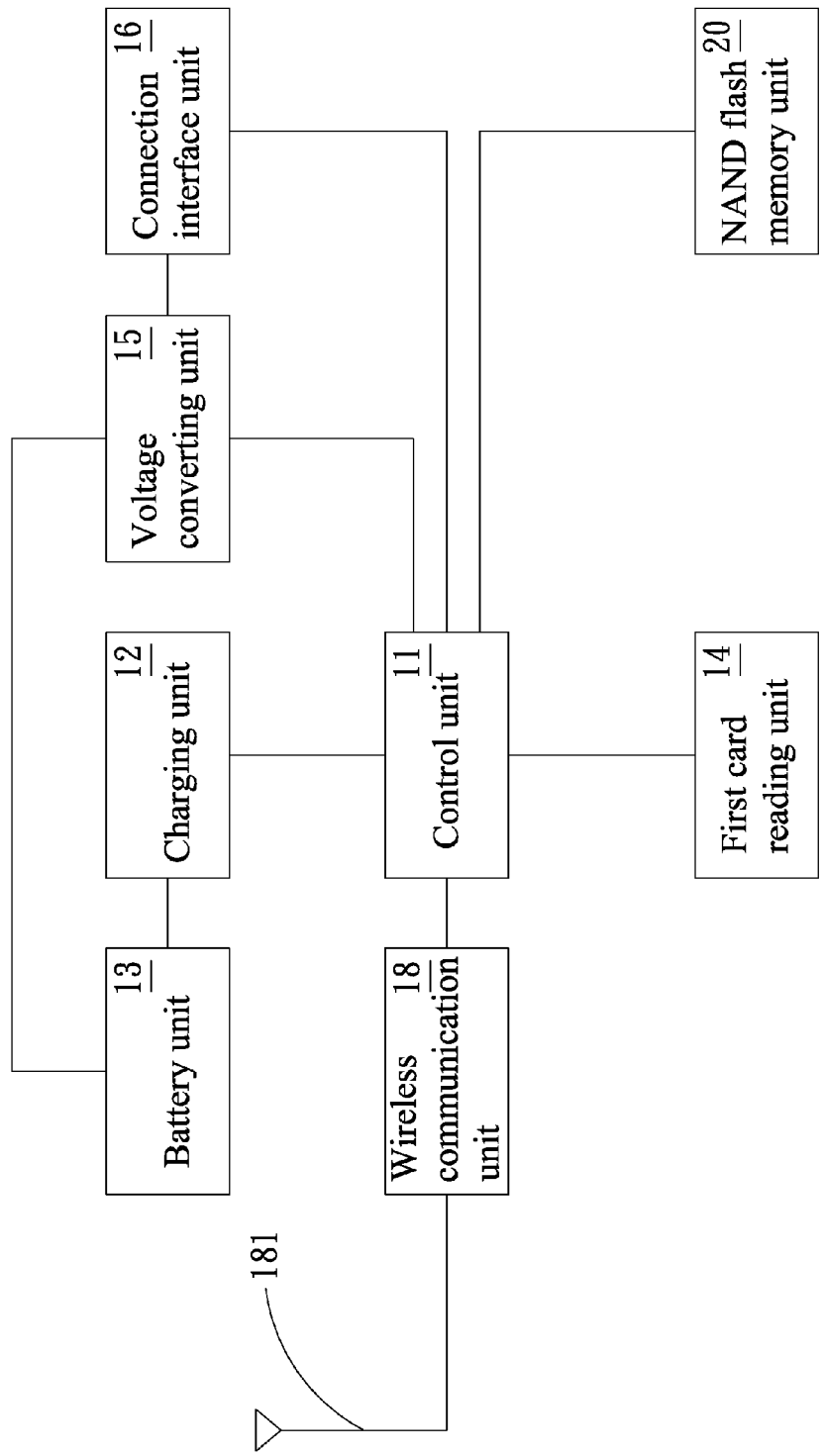
FIG. 5A is a block diagram of a portable power bank with card reading function according to a fourth preferred embodiment of the present invention.

FIG. 5A is a block diagram of a portable power bank with card reading function according to a fourth preferred embodiment of the present invention. As shown, the fourth preferred embodiment is generally structurally similar to the second preferred embodiment, except for a NAND flash memory unit 20 which serves as a data storage interface for the present invention. The NAND flash memory unit 20 is composed of NAND flash chips, which can be expanded or replaced according to actual need, so as to increase the storage capacity of the NAND flash memory unit 20.

Figure 5B:
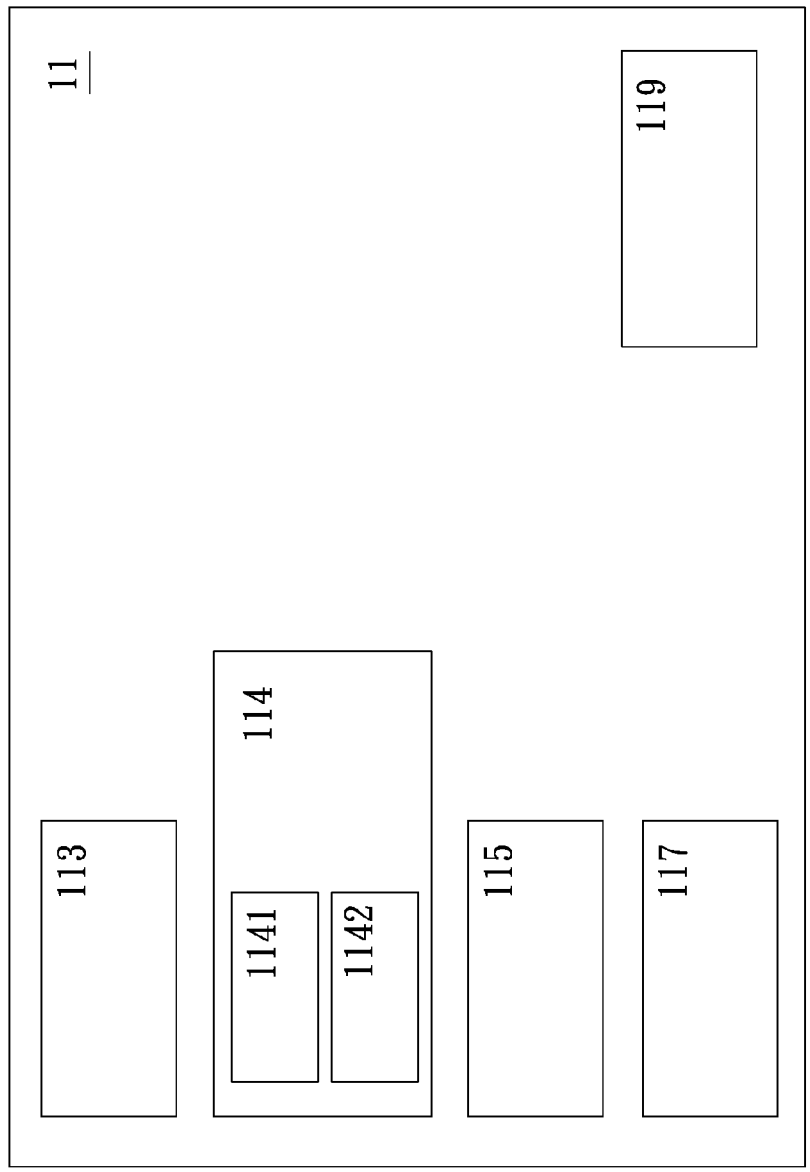
FIG. 5B is a block diagram of a control unit for the portable power bank with card reading function according to the fourth preferred embodiment of the present invention.

Please refer to FIG. 5B. The control unit 11 for the fourth preferred embodiment is different from the second preferred embodiment in further including a NAND flash memory module 119 for electrically connecting to the NAND flash memory unit 20. As can be seen from FIG. 5C, the NAND flash memory module 119 includes a NAND flash memory interface sub-module 1191, an error correction code (ECC) sub-module 1192, and an error detection code (EDC) sub-module 1193. The NAND flash memory interface sub-module 1191 is connected to the NAND flash memory unit 20; and the ECC sub-module 1192 and the EDC sub-module 1193 are executed to generate an error correction code or an error detection code based on the input data.

The error correction code can be, but not limited to, a Hamming code or a Reed-Solomon code. The error detection code can be, but not limited to, a check code, a longitudinal redundancy check (LRC) code, a cyclic redundancy check (CRC) code, or an 8b/10b code having one or more bytes.

The use of the first, the second and the third preferred embodiments of the present invention are described below.

Figure 6:
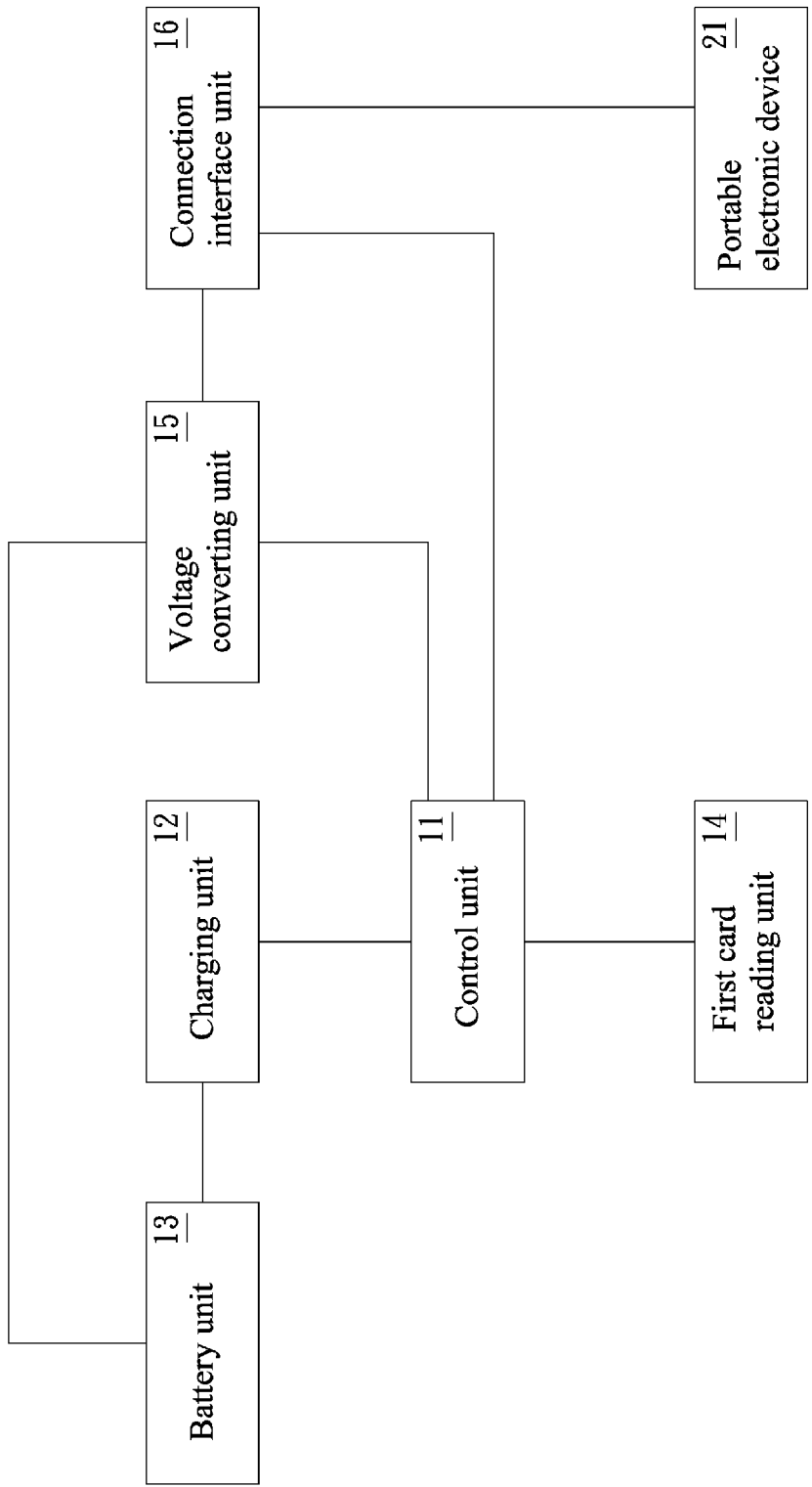
FIG. 6 is a block diagram showing the use of the first preferred embodiment of the present invention.

FIG. 6 is a block diagram showing the use of the first preferred embodiment of the present invention. Please refer to FIG. 6 along with FIGS. 1A to 1C. When the connection interface unit 16 has a portable electronic device 21 removably connected thereto, the control unit 11 controls the charging unit 12 and the first card reading unit 14, so that the portable electronic device 21 can store data to the first removable electronic card via the connection interface unit 16, or read or execute data in the first removable electronic card, such as an APP program. In this way, it is able to achieve the purpose of data backup or expansion of memory capacity for the portable electronic device 21. Moreover, the detection module 152 of the voltage converting unit 15 detects the voltage and current of the portable electronic device 21. In the event the portable electronic device 21 is detected as low in potential, the battery power supply stored in the battery unit 13 is converted in voltage at the voltage converting unit 15 for charging the portable electronic device 21 via the connection interface unit 16.

Figure 7A:
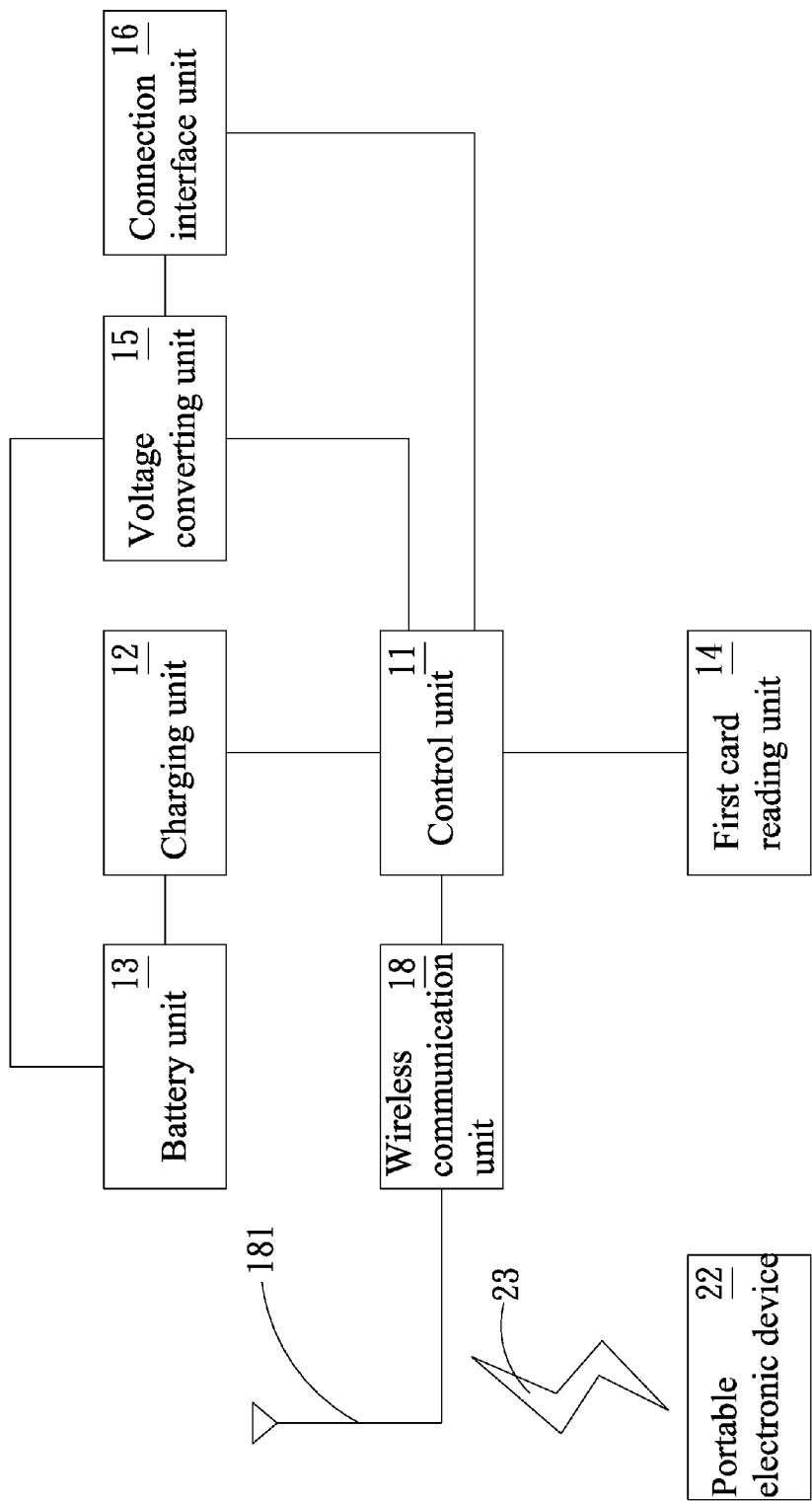
FIG. 7A is a block diagram showing a first manner of using the second preferred embodiment of the present invention.

FIG. 7A is a block diagram showing a first manner of using the second preferred embodiment of the present invention. Please refer to FIG. 7A along with FIGS. 3A to 3C. In the case a user selects to actuate the AP sub-module 1171 of the wireless communication module 117 in the control unit 11, the portable power bank of the present invention will then function as a wireless AP, and another portable electronic device 22 can be directly linked with the wireless communication unit 18 by generating a wireless signal 23, which is received by the antenna 181. At this point, the card-reading-unit module 114 and the data transmission module 115 in the control unit 11 control the first card reading unit 14 to access the first removable electronic card, so that the portable electronic device 22 can wirelessly store data to the first removable electronic card or wirelessly read or execute data in the first removable electronic card, such as an APP program, to achieve the purpose of data backup or expansion of memory capacity.

Figure 7B:
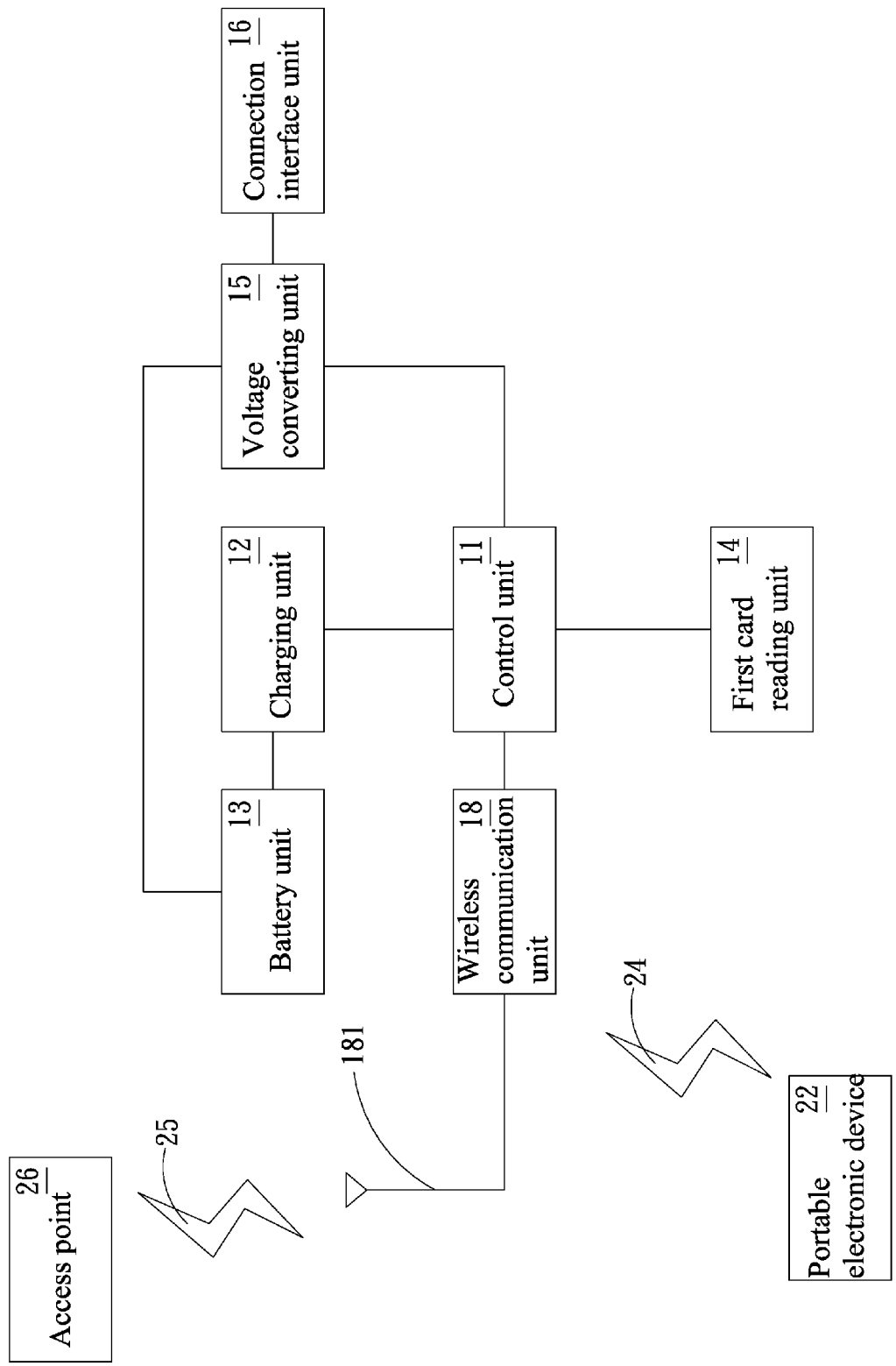
FIG. 7B is a block diagram showing a second manner of using the second preferred embodiment of the present invention.

FIG. 7B is a block diagram showing a second manner of using the second preferred embodiment of the present invention. Please refer to FIG. 7B along with FIGS. 3A to 3C. In the case a user selects to actuate the client sub-module 1172 of the wireless communication module 117 in the control unit 11, the portable power bank of the present invention will then function as a client, and another portable electronic device 22 can inform the wireless communication unit 18 to link with another access point (AP) 26 by generating a wireless signal 24, which is received by the antenna 181. Then, the wireless communication unit 18 generates another wireless signal 25 to wirelessly link with the access point 26.

Figure 8:
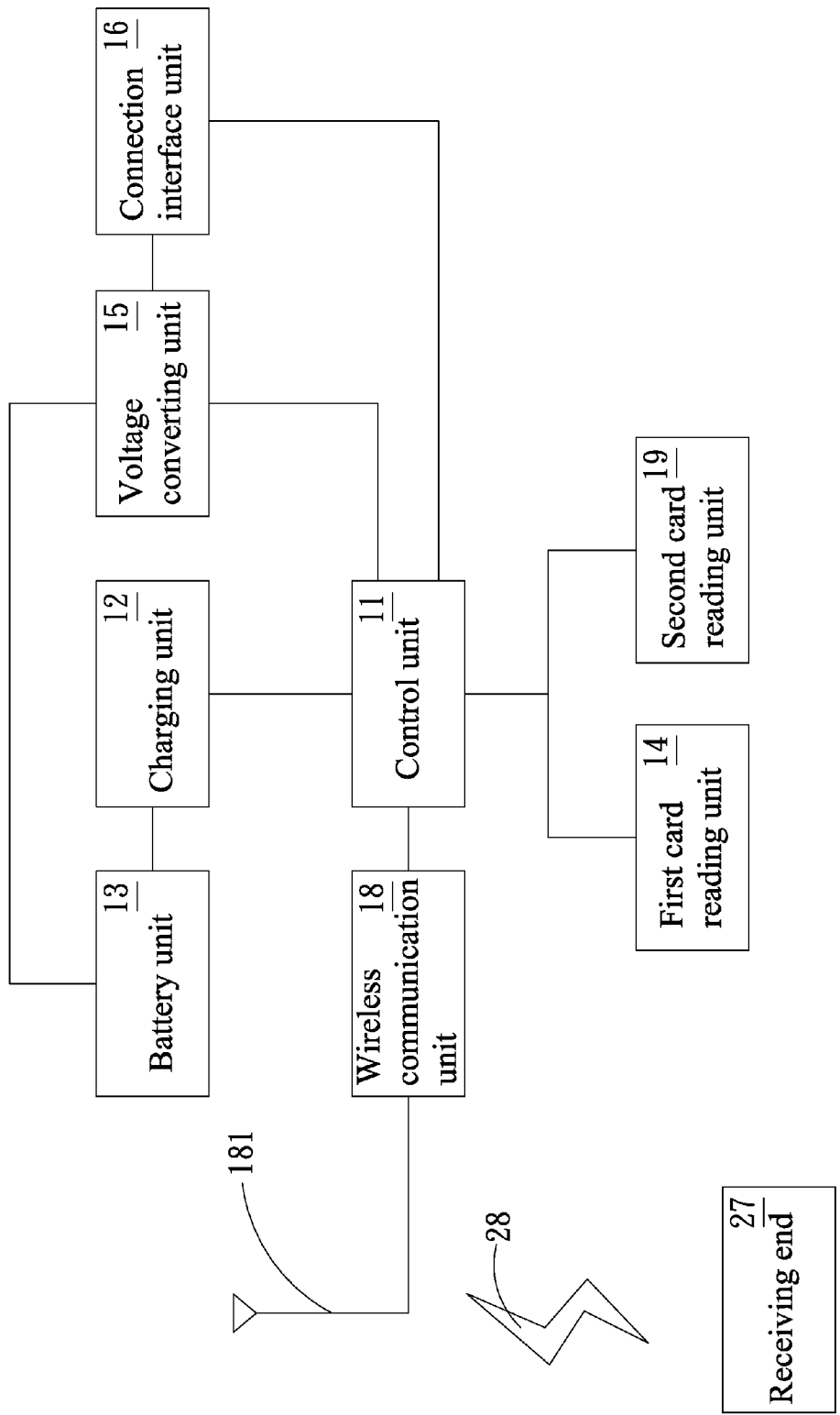
FIG. 8 is a block diagram showing the use of the third preferred embodiment of the present invention.

FIG. 8 is a block diagram showing the use of the third preferred embodiment of the present invention. Please refer to FIG. 8 along with FIGS. 4A to 4C. When a receiving end 27 is linked with the wireless communication unit 18 by generating a wireless signal 28, which is received by the antenna 181, the wireless communication unit 18 will then inform the control unit 11, so that the control unit 11 controls the second card reading unit 19 to read the data in the second removable electronic card. The read data is encrypted at the encryption module 111 in the control unit 11 and then wirelessly transmitted to the receiving end 27. The encrypted data is then encrypted by a management system at the receiving end 27.

With the above arrangements, the portable power bank with card reading function according to the present invention includes the following advantages:

(1) It not only enables expansion of memory capacity or data backup for a portable electronic device connected thereto, but also supplies supplementary power to the portable electronic device;

(2) It not only provides card reading function to enable a portable electronic device connected thereto to access data in both wired and wireless manner, but also supplies supplementary power to the portable electronic device;

(3) It not only provides the card reading function, but also enables linking with a receiving end via wireless transmission;

(4) It can output a sound signal from a portable electronic device connected thereto; and (5) It includes a NAND flash memory unit to serve as a storage interface for a portable electronic device.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A portable power bank with memory card reading function adapted to connect to at least one electronic device, comprising:

a battery unit being coupled with a charging unit and a voltage converting unit; and the battery unit storing an external power supply via the charging unit and outputting a battery power supply via the voltage converting unit, wherein the battery unit, the charging unit and the voltage converting unit are disposed within the portable power bank;

a control unit disposed within the portable power bank and being coupled with the charging unit and the voltage converting unit, the control unit including a charging module, a card-reading-unit module, and a data transmission module, wherein the card-reading-unit module includes a host sub-module and a client sub-module;

a first memory card reading unit being configured for a first removable electronic card to insert thereinto and being coupled with the control unit, so as to access the first removable electronic card under control of the control unit, wherein the first memory card reading unit is disposed within the portable power bank;

a connection interface unit being coupled with the voltage converting unit and the control unit, and the electronic device being removably connected to the connection interface unit to access the first removable electronic card inserted in the first card reading unit and is supplied supplementary power by the battery unit, wherein the connection interface unit is disposed within the portable power bank; and wherein the host sub-module or the client sub-module of the control unit is actuated and the data transmission module informs the electronic device of the position of the card-reading-unit module when the electronic device is connected to the portable power bank, and the first removable electronic card inserted in the first card reading unit is accessed by the electronic device, and is used as an expanded memory capacity for the electronic device.

2. The portable power bank with memory card reading function as claimed in claim 1, wherein the connection interface unit is a USB connection interface.

3. The portable power bank with memory card reading function as claimed in claim 1, wherein the first removable electronic card is selected from the group consisting of a Secure Digital (SD) card, a Near Field Communication (NFC) card, a Compact Flash (CF) card, a Smart Media card (SMC), a Multi Media card (MMC), and a Memory Stick (MS) card.

4. The portable power bank with memory card reading function as claimed in claim 1, wherein the first removable electronic card has at least one APP program stored therein.

5. The portable power bank with memory card reading function as claimed in claim 1, further comprising a light-emitting unit electrically coupled with the voltage converting unit, and the light-emitting unit is disposed within the portable power bank.

6. The portable power bank with memory card reading function as claimed in claim 5, wherein the light-emitting unit is a light-emitting diode (LED).

7. The portable power bank with memory card reading function as claimed in claim 1, wherein the control unit further includes a wireless communication module.

8. The portable power bank with memory card reading function as claimed in claim 7, wherein the wireless communication module includes an access point (AP) sub-module and a client sub-module.

9. The portable power bank with memory card reading function as claimed in claim 7, further comprising a wireless communication unit electrically coupled with the control unit, and the wireless communication unit is disposed within the portable power bank.

10. The portable power bank with memory card reading function as claimed in claim 9, wherein the wireless communication unit is adapted to receive any one of a Bluetooth signal, a HiperLAN signal, a Triple Play signal, a GSM/GPRS signal, a 3G signal, a 3.5G signal, a 4G signal, an IEEE802.11 signal, an IEEE802.3 signal, an 802.15 signal, an 802.11 signal, and a WiFi Direct signal.

11. The portable power bank with memory card reading function as claimed in claim 10, wherein the wireless communication unit includes an antenna.

12. The portable power bank with memory card reading function as claimed in claim 11, further comprising a second memory card reading unit being configured for a second removable electronic card to insert thereinto and being coupled with the control unit, so as to access the second removable electronic card under control of the control unit, wherein the second memory card reading unit is disposed within the portable power bank.

13. The portable power bank with memory card reading function as claimed in claim 12, wherein the second removable electronic card is selected from the group consisting of a smart card, a magnetic card, a barcode card, and a proximity card.

14. The portable power bank with memory card reading function as claimed in claim 12, wherein the control unit further includes a security module.

15. The portable power bank with memory card reading function as claimed in claim 14, wherein the security module is a digital rights management (DRM) processor, and includes an encryption sub-module and a decryption sub-module.

16. The portable power bank with memory card reading function as claimed in claim 9, further comprising a NAND flash memory unit being disposed within the portable power bank.

17. The portable power bank with memory card reading function as claimed in claim 16, wherein the control unit further includes a NAND flash memory module.

18. The portable power bank with memory card reading function as claimed in claim 17, wherein the NAND flash memory module includes a NAND flash memory interface sub-module, an error correction code (ECC) sub-module, and an error detection code (EDC) sub-module; and the NAND flash memory interface sub-module being connected to the NAND flash memory unit.

19. The portable power bank with memory card reading function as claimed in claim 9, wherein the wireless communication unit is selected from the group consisting of a WiFi communication unit, a 3 G communication unit, a 4 G communication unit, and a Bluetooth communication unit.

20. The portable power bank with memory card reading function as claimed in claim 9, wherein the wireless communication unit is selected from the group consisting of a WiFi router, a 3G router, and a 4G router.

21. The portable power bank with memory card reading function as claimed in claim 1, wherein the voltage converting unit is used to convert a voltage of the external power supply input via the connection interface unit.

22. The portable power bank with memory card reading function as claimed in claim 21, wherein the voltage converting unit further includes an overload protection module for preventing excessive output current, and a detection module for detecting voltage and current of the electronic device connected to the connection interface unit.

23. The portable power bank with memory card reading function as claimed in claim 1, further comprising an amplifier unit coupled with the control unit, the battery unit and a loudspeaker unit, wherein the amplifier unit and the loudspeaker unit are disposed within the portable power bank.

24. The portable power bank with memory card reading function as claimed in claim 23, wherein the control unit further includes a sound interface module connected to the amplifier unit.

* * * * *